(12) United States Patent
Kanajan et al.

(10) Patent No.: US 11,215,471 B2
(45) Date of Patent: Jan. 4, 2022

(54) AUTONOMOUS VEHICLE POSITIONING FOR TRIP OPTIMIZATION

(71) Applicant: Uber Technologies, Inc., San Francisco, CA (US)

(72) Inventors: Sri Kanajan, San Francisco, CA (US); Andrew Raymond Sturges, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 213 days.

(21) Appl. No.: 16/538,236

(22) Filed: Aug. 12, 2019

(65) Prior Publication Data

US 2020/0240805 A1 Jul. 30, 2020

Related U.S. Application Data

(60) Provisional application No. 62/796,903, filed on Jan. 25, 2019.

(51) Int. Cl.

| | | |
|---|---|---|
| *G01C 21/34* | (2006.01) | |
| *G08G 1/00* | (2006.01) | |
| *G07B 15/02* | (2011.01) | |
| *G06F 15/16* | (2006.01) | |
| *G06Q 10/08* | (2012.01) | |

(Continued)

(52) U.S. Cl.
CPC ..... *G01C 21/3492* (2013.01); *G01C 21/3438* (2013.01); *G05D 1/0088* (2013.01); *H04W 4/021* (2013.01)

(58) Field of Classification Search
CPC ...... G01C 21/34; G01C 21/3658; G08G 1/00; G07B 15/02; G06F 15/16; G06Q 10/08
See application file for complete search history.

(56) References Cited

U.S. PATENT DOCUMENTS 6,917,982 B1 * 7/2005 Dueck .................. G06Q 10/047
370/352
2005/0199717 A1 * 9/2005 Park ....................... G06Q 10/08
235/385

(Continued)

OTHER PUBLICATIONS

"Bayesian Updating: Continuous Priors", 18.05 Introduction to Probability and Statistics, (Jan. 1, 2017), 24 pgs.

*Primary Examiner* — Yuri Kan
(74) *Attorney, Agent, or Firm* — Schwegman Lundberg & Woessner, P.A.

(57) ABSTRACT

Techniques are provided for determining where to position vehicles for trip optimization or where to map roads for use by autonomous or semi-autonomous vehicles. The techniques include identifying, from historical trip data, common pickup and drop-off points within a geographical area where respective geohashes are used as nodes in the geographical area. A number of trips between respective nodes in the geographical area within a predetermined time frame define edges between respective nodes in the geographic area. The nodes and edges for the geographic area are processed to score each node to identify most active nodes within the geographic area as potential pickup/drop-off zones. The top k potential pickup-drop-off zones are evaluated for suitability as a pickup/drop-off zone, and lane IDs, suitable pickup/drop-off zones, and/or trip lists derived from the historical trip data are provided for use in positioning vehicles or mapping roads.

22 Claims, 6 Drawing Sheets

(51) Int. Cl.
H04W 4/021 (2018.01)
G05D 1/00 (2006.01)

(56) References Cited

U.S. PATENT DOCUMENTS

2017/0091708 A1* 3/2017 Rao .................... G06Q 10/0833
2018/0061242 A1* 3/2018 Bavar ................ G01C 21/3407

* cited by examiner

AUTONOMOUS VEHICLE POSITIONING FOR TRIP OPTIMIZATION

CROSS-REFERENCE TO RELATED APPLICATIONS

This application claims the benefit of priority of U.S. Provisional Patent Application Ser. No. 62/796,903, filed Jan. 25, 2019, the contents of which are hereby incorporated by reference for all purposes.

FIELD

This document pertains generally, but not by way of limitation, to devices, systems, and methods for managing autonomous vehicles and, more particularly, to techniques for determining what parts of a city to map for autonomous vehicle travel and for determining where to deploy and position autonomous vehicles in the mapped areas to optimized usage and profitability.

BACKGROUND

An autonomous vehicle (AV) is a vehicle that is capable of sensing its environment and operating some or all of the vehicle's controls based on the sensed environment. An AV includes sensors that capture signals describing the environment surrounding the vehicle and a navigation system that responds to the inputs to navigate the AV along a travel route without human input. In particular, an AV can observe its surrounding environment using a variety of sensors and can attempt to comprehend the environment by performing various processing techniques on data collected by the sensors. Given knowledge of its surrounding environment, the AV can determine an appropriate motion plan relative to a travel route through its surrounding environment.

The determination of a travel route along which an AV can navigate can be based at least in part on map data. The map data must be collected and updated to reflect where the autonomous vehicle may safely operate. A first challenge in operating AVs is thus to capture the appropriate map data and to provide the map data to the AV.

Another problem is establishing where to deploy the AVs for optimal usage in a given mapped geographic area. For example, when choosing to deploy AVs to a mapped geographic area, the number of travel requests and the time of such travel requests is important when considering where to deploy the AVs. Also, the AVs must be limited to mapped areas for travel. It is thus desired to provide techniques to establish what parts of a city to map for AV travel and to establish where to deploy the AVs for optimal usage in the mapped areas.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Reference now will be made in detail to embodiments, one or more example(s) of which are illustrated in the drawings. Each example is provided by way of explanation of the embodiments, not limitation of the present disclosure. It will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The system described herein identifies the roads and lanes within a geographic area that are good candidates for autonomous vehicle (AV) deployment and further identifies where to locate pickup/drop-off zones (PDZs) at particular times to optimize AV usage. Determining where to deploy the AVs includes evaluating the performance of a given set of routes and recommending a subnetwork that has sufficient addressable trips and performance. The locations for the PDZs in sample embodiments is based on where AV travel demand is maximized along addressable routes. The PDZ selection implements a recommender algorithm for selecting the locations for PDZ placement as well as a pickup/drop-off optimizer for selecting the routes among the PDZs so as to maximize paying rides in the deployed AVs.

A challenge in determining where to deploy the AVs is to find a candidate road network that has low intervention probability and high trip count. As used herein, "intervention" refers to an event where a vehicle operator or passenger would need to take over control of the vehicle. By developing such a road network, an organization managing the AVs can prioritize which interventions to resolve and ensure that the pick-up and drop-offs when in fully autonomous or no vehicle operator (NVO) mode (vehicle does not have a driver physically inside the vehicle during pick-ups and drop-offs) are in road networks where interventions are least likely while still ensuring that there will still be sufficient trip demand for the AVs.

Other terms and definitions used herein include "geohash," which is standardized square area of the planet that can be referenced by an n character string. For example, a specific 7-character geohash is a 114 square meter area of the earth. Also, as used herein, a "route" is a specific instantiation of trips (e.g., UberX trips) where the set of lane globally unique identifiers (GUIDs) for that trip is defined.

In sample embodiments, the system collects lane level performance metrics by evaluating historical trip data (e.g., UberX trips or taxi data) to determine the number of failures (i.e., interventions) in a given lane as a percentage of the total number of passes through the given lane. A connected component network is derived from the lane level performance metrics and historical trips are routed to evaluate route level performance metrics. The trips are optionally filtered based on a desired minimum performance requirement to rederive connected components that can serve as a subset of the filtered trips. The resulting trip data may be further processed to identify high potential PDZs to unlock more trips for consideration. The trips may further be manually checked for situational capability before delivering lane IDs, PDZs and trip playlists to the deployment planner.

In the sample embodiments, systems and methods are provided for determining where to position vehicles for trip optimization or where to map roads for use by autonomous or semi-autonomous vehicles. The methods include identifying, from historical trip data, common pickup and drop-off points within a geographical area, where the common pickup and drop-off points are defined by respective geohashes as nodes in the geographical area. A number of trips between respective nodes in the geographical area within a predetermined time frame is identified from the historical trip data, where the number of trips is defined as edges between nodes in the geographic area. The nodes and edges are processed to score each node to identify most active nodes within the geographic area as potential pickup/drop-off zones in the geographical area, and the top k potential pickup-drop-off zones are evaluated for suitability as a pickup/drop-off zone. The outputs of the method include lane IDs, pickup/drop-off zones, and trip lists for use in positioning vehicles or mapping roads based on the evaluated top-k pickup/drop-off zones in the geographical area. In the sample embodiments, a subset of an existing map may be identified as the geographical area.

In the sample embodiments, identifying common pickup and drop-off points from historical trip data includes evaluating lane level performance metrics in the historical trip data to identify and to exclude lanes having more than a predetermined number of autonomous vehicle failure events. A connected component network of lanes is derived from the historical trip data and a subgraph is extracted from the connected component network for lanes having vehicle traversal data. Vehicle trips are routed on the connected component network and pickup and drop-off points for vehicle trips are matched to specific lane GUIDs. Lane level performance metrics are also used to compute estimates for a probability of success of a vehicle completing a vehicle trip along a selected route. A trip and a corresponding route are selected based on satisfying a user selected metric. A superset of all lanes involved in selected trips are selected and a connected component within the superset of all lanes is extracted.

In other sample embodiments, trips are removed from the historical trip data that do not satisfy a minimum performance requirement. The connected component network of lanes is then rederived after removing the trips that do not satisfy the minimum performance requirement. The recommended the pickup/drop-off zones may be further optimized to select those pickup/drop-off zones that enable more trips within the rederived connected component network. For example, optimizing the pickup-drop-off zones may include filtering trips to identify pickup/drop-offs that occur within a given number of meters from the rederived connected component network.

In further sample embodiments, a clustering algorithm is used to cluster trips data in the rederived connected component network into 7-character geohashes and an undirected weighted graph is built that has nodes representing geohashes and edges representing pickup/drop-off characteristics between respective geohashes. An eigenvector centrality algorithm is run on the undirected weighted graph to rank order the nodes relative to the importance of each node in unlocking a highest number of trips. The weights for the nodes in the undirected weighted graph may be determined as a function of a mean number of trips per period of time for pickups and drop-offs at a node, and the edges in the undirected weighted graph may be represented as more significant as more trips data is provided between respective geohashes defining the edges.

In still further sample embodiments, any lanes having more than a predetermined number of autonomous vehicle failure events are removed from the historical trip data before evaluating route level performance metrics for the connected component network. For instances where not enough traversal data is available or where normalization of the historical trip data is needed, an empirical Bayesian algorithm is used to augment the historical trip data to normalize historical trip data comprising a large number of traversals over identified lanes with historical trip data comprising a small number of traversal over identified lanes. Also, other user specified metrics may be calculated such as a probability of success metric for a selected route as a function of a product of chances of success for each lane in the selected route and a miles per intervention metric as a function of a length of a trip divided by a number of lane failures per vehicle traversal.

These and other features will become more apparent from the following description in connection with the attached figures.

Figure 1:
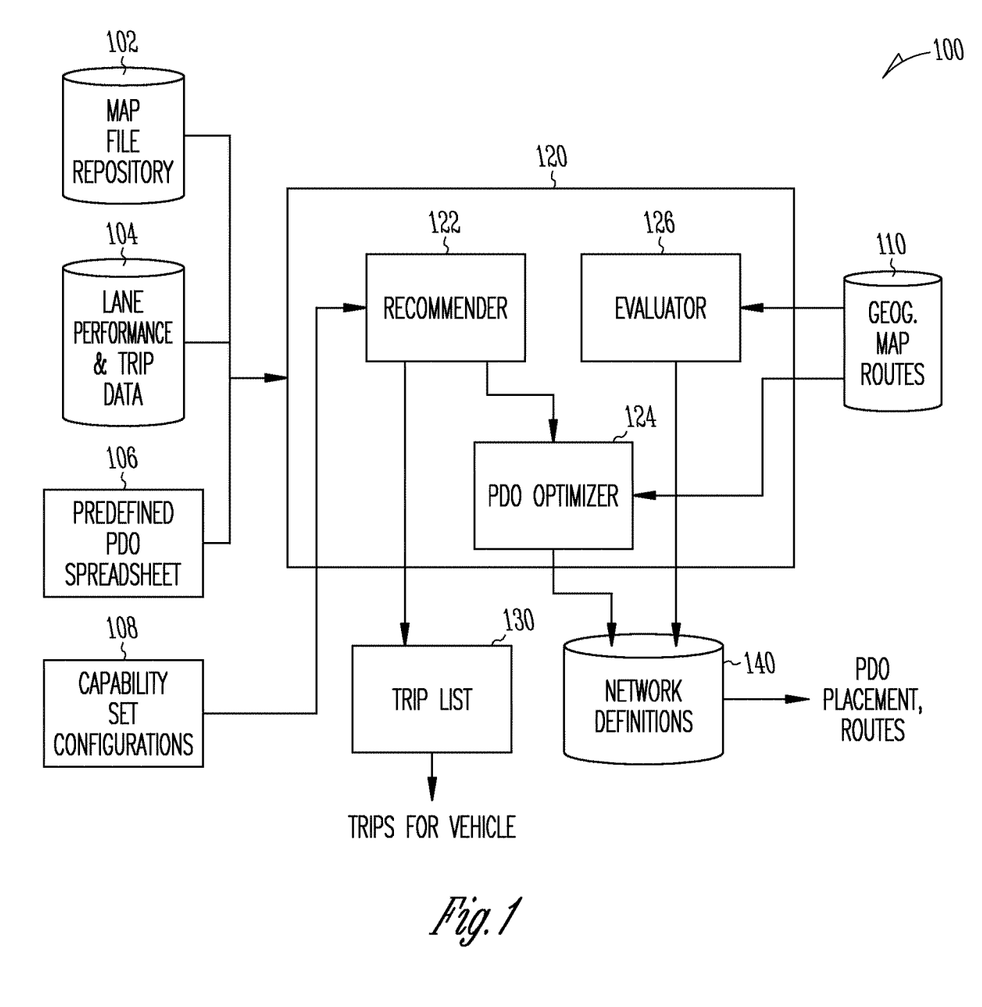
FIG. 1 is a block diagram of an example system for determining where to deploy autonomous or semi-autonomous vehicles using historical trip data.

FIG. 1 is a block diagram of an example system 100 for determining where to deploy autonomous or semi-autonomous vehicles using trip data. As illustrated, the system 100 processes data from a number of data sources to generate proposed trips and/or locations for placement of PDZs based on the received data. The data sources include map file repository 102, lane performance and trip data 104, and optionally a predefined pickup/drop-off (PDO) spreadsheet 106 of proposed PDO locations. The data sources also include capability set configuration data 108 that defines capabilities of the candidate map network to, for example, remove lanes that do not satisfy user specified criteria. This data along with route definitions from geographical map routes storage 110 (e.g., in the form of polygons on a map) is provided to positioning system 120 for processing to identify where to position the autonomous or semi-autonomous vehicles in a sample embodiment.

Positioning system 120 includes a recommender 122 that implements a recommender algorithm to process the received data to exploit connected component lane ID, recommended pickup/drop-off zones, and trip sets from input sources 102-108 to generate a recommended trip list 130 as well as a set of lanes and trips including pickup/drop-off (PDO) locations that are, in turn, optimized by PDO Optimizer 124 to identify lanes, trips, and PDO locations that optimize vehicle utilization and/or profitability. These optimized PDO locations and associated routes are stored in a network definitions library 140 for access when identifying PDOs and routes for a given set of map routes.

The evaluator 126 receives as input from geographical map routes storage 110 a list of routes and a lane GUID list per route as well as performance data on each lane. The evaluator 126 outputs a trip-level and/or lane level performance data that provides performance metric visualizations at the lane and route level. The evaluator 126 thus implements a subset of what the recommender 122 does. Essentially, given a set of routes, each represented by the list of lane GUIDs, the evaluator 126 returns a visualization representing metrics at the route level and lane level.

A trip selector (not shown) identifies the set of trips from trip list 130 to emulate and to run using the AV. For example, the trip set may be chosen based on the potential of unlocking new PDOs that have a large number of addressable trips based on the weighted graph.

The techniques for processing the lane IDs, PDZs and trip playlist data to determine where to deploy the PDZs and what routes for the AVs to follow are implemented by a recommender algorithm operating in recommender 122. A sample embodiment of the recommender algorithm is described below.

Recommender Algorithm

Figure 2:
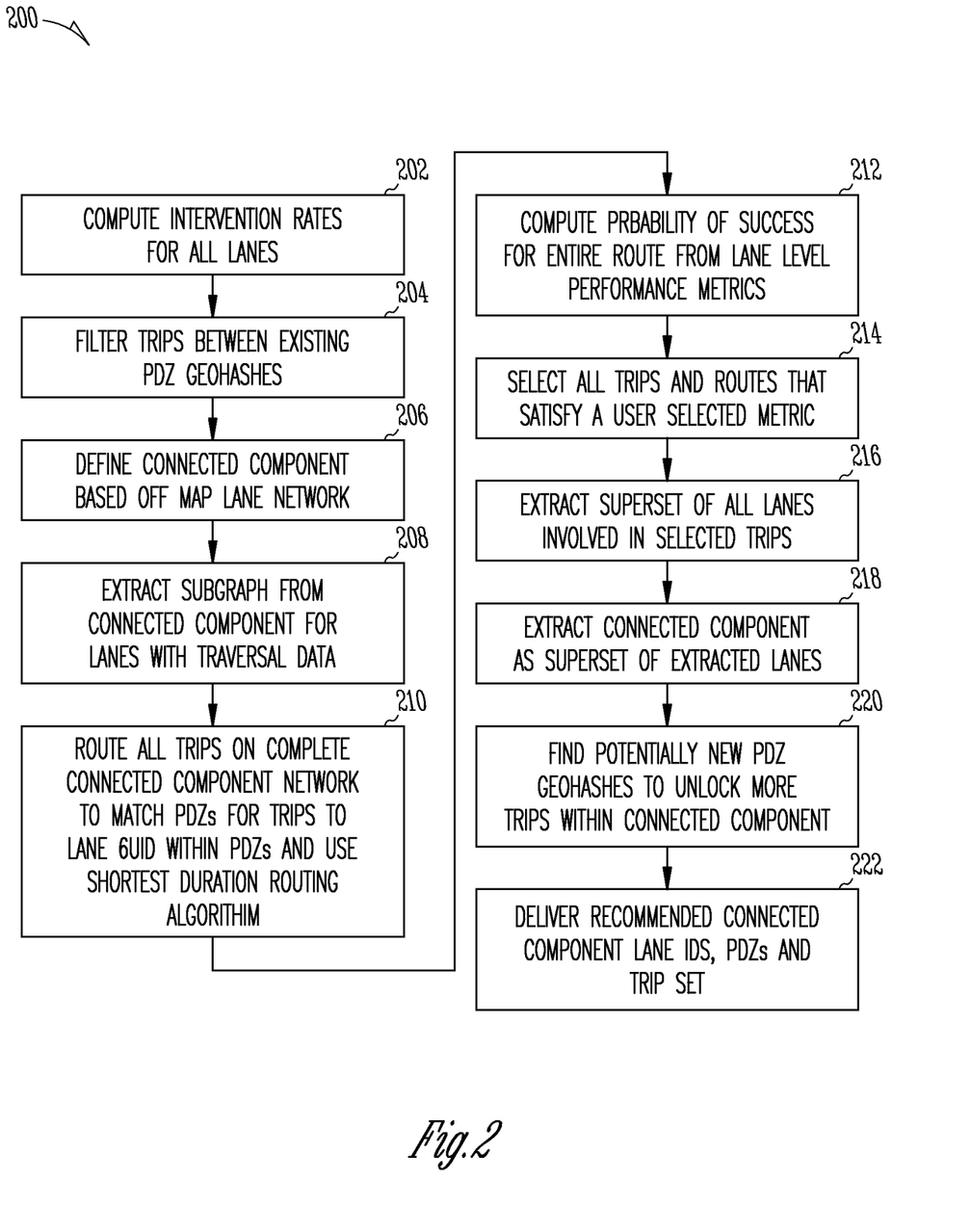
FIG. 2 is a flow chart of a recommender algorithm for determining where to deploy autonomous or semi-autonomous vehicles in an example embodiment.

The recommender algorithm implements the flow chart 200 illustrated in FIG. 2 to generate a recommended set of lane IDs, recommended PDZs, and trip sets for deploying AVs in sample embodiments. In particular, the recommender algorithm in a sample embodiment implements the method 200 to prioritize the location and placement of PDZs and/or to select roadways for AV vehicle travel by computing at 202 an estimate of intervention rates with confidence intervals for all lanes using Empirical Bayesian estimation where there is not enough data available for a trustworthy estimate. The system then filters only historical trips (e.g., UberX trips) at 204 that go between existing PDZs geohashes. The map data may exclude subsets of the map data that cannot be handled by the AV, such as unprotected lefts and cul-de-sacs or other map portions that are non-traversable by the AV. These steps are optional. The achievable PDZs would be derived that provide the maximum trips in that subnetwork. The overall network is defined at 206 as a connected component based on the maps lane network without any form of capability set filtering. A subgraph is extracted from the connected component at 208 for lanes with traversal data. At 210, all trips (e.g., UberX trips) are routed on the overall complete connected component map network. The routing includes matching pickup and drop-off for the trip data to a specific lane GUID within the PDZ and using, for example, Djikstra's shortest path between two nodes using a lane traversal time (assume AV goes at the speed limit for that lane) routing algorithm (e.g., from the Motion Planning module of the AV) to ensure consistency in the routing. Using the lane level performance metrics, point estimates and empirical Bayes estimates are computed at 212 for miles per intervention (MPI) and the probability of success metrics for the entire route.

The recommender algorithm then selects all trips along with corresponding routes at 214 that satisfy a threshold on a user selected metric, and the superset of all lanes involved in all of the selected trips is extracted at 216. The connected component within these lanes are extracted at 218 to identify the candidate routes that enable trips that satisfy some level of performance guarantee. A pick-up/drop-off (PDO) Optimizer 124 as described below is utilized to find potentially new PDZ geohashes at 220 that unlock even more trips within this connected component. For example, mean trips per day may be used as an objective function metric. The candidate map network may optionally be checked against a specific capability set 108 to remove lanes that do not satisfy user specified criteria. The recommended connected component lane ids, recommended PDZs, and trip set are then delivered at 222 to the trip list 130 and the PDO Optimizer 124 for use in determining which vehicle trips to suggest and where to deploy the vehicles for maximum utilization and/or profitability. An AV deployment entity may use such data for deployment of one or more AVs. On the other hand, such data may be used to determine where to obtain map data when creating maps in a new geographic area.

As noted above, a number of metrics may be used when implementing sample embodiments. In such sample embodiments, the recommender algorithm has extensible metric definitions such that the road network can be pruned using different metrics at the route level. In sample embodiments, such metrics include an empirical Bayes techniques metric, a probability of success in route metric, and a miles per intervention metric, each of which is described below.

Empirical Bayes Technique Metric

The empirical Bayes technique metric is used to deal with the fundamental issue of dealing with lanes with small and large numbers of traversals and normalizing between them. In sample embodiments, a number of occurrences k of events with probability p on lane i with n traversals can be described as (note that a similar treatment can be performed at the route level with the difference that it is a Poisson distribution instead since there are multiple event occurrences within a window which is the entire route):

$$k_i \sim \text{Binomial}(n_i, p_i)$$

One could simply define $p_i = (\text{numEvents}_i)/(\text{numTraversals}_i)$. However, the number of traversals varies greatly across lanes and hence this estimate becomes less and less precise as n decreases. Also, it would be prudent to take advantage of intervention and traversal data from other lanes to help estimate $p_i$ for lanes where less data is available. This assumes lanes are similar and hence data from one lane can be used to help estimate p for another lane.

In order to derive an expected value of $p_i$ that accounts for the uncertainty while taking advantage of data from other lanes, one can apply the Bayes theorem to come up with a way to estimate the distribution of $p_i$ for every lane. Having the distribution allows the uncertainty to be factored in by taking the lower end of the confidence interval and using that number as the estimation for $p_i$ versus using the expected value (mean):

$$p_i \sim \text{Beta}(\alpha, \beta), i = 1 \ldots N$$

An empirical Bayes estimator can be constructed as the expectation of posterior distribution $E(p_i | k_i, \alpha, \beta, n_i) = (k + \alpha_0)/(n + \alpha_0 + \beta_0)$ where k is the number of events in lane i and n is the total number of traversals in lane i. $\alpha_0$ and $\beta_0$ represent the prior performance. This provides the expected probability of failure for lane i given the prior information along with the data for that lane. The intuition for this equation is that, when n and k are small, the performance is dominated by the prior performance. However, as n and k get larger, the influence of the prior performance diminishes, and the performance tends towards the traditional Maximum Likelihood Estimator for the expected value which in this case is simply k/n.

The posterior distribution for each lane may then obtained follows:

1. Collect $p_i = k/n$ for lanes with at least N traversals. It is noted that the prior performance must use lanes with considerable traversals so that the prior distribution is reasonably well-defined. The prior performance is taken from all the lanes that have at least N traversals and then fitting these $p_i$ values to a beta distribution which is the conjugate prior for the binomial. $\alpha_0$ and $\beta_0$ represent the parameters of the prior distribution.

2. For each lane, calculate the posterior probability distribution and expected value using the Bayes theorem. The posterior probability $P(p_i | k_i, \alpha_0, \beta_0, n_i)$ can be characterized as a beta distribution with $\alpha = k + \alpha_0$ and $\beta = n - k + \beta_0$. This formula comes from solving the Bayes theorem where the prior is characterized as the β with $\alpha_0$ and $\beta_0$ and the likelihood is the standard binomial equation that sets for a probability distribution for each lane:

$$P(p_i|k_i,n_i)=(P(k_i,n_i|p_i)P(\alpha_0,\beta_0))/(\int_0^1 p(k_i,n_i))=\beta eta(k_i+\alpha_0, n_i-k_i+\beta_0)$$

3. Upon determining the probability distribution for each lane, a Monte Carlo sampling technique may be used to generate random samples of the posterior probability of failure distribution of each of these lanes in order to generate a metric at the route level. The resulting random samples at the route level represent the approximate distribution for the product of G different β distributions. A percentile on this distribution may be taken to extract out a probability distribution metric that factors in both the uncertainty as well as the size of the value.

For the purposes of simplicity, this technique is referred to below as the function call EB(x), which implies that the distribution for the random variable x is derived using the Empirical Bayes technique.

It is noted that the end goal is to evaluate how the AV would perform on a given trip relative to some performance metric that relates to how intervention-less the trip is. Thus, the lane level metrics may be used to compose route level metrics such as a metric defining a probability of success in the route.

Probability of Success in Route Metric

The number of interventions on a given lane is distributed in a binomial fashion with a probability p. If it is assumed that the prior knowledge on the probability p is a β distribution (for mathematical convenience since β is the conjugate prior of the binomial), then the posterior P (p given data) is also a β distribution per the Bayes theorem, where P is defined as the probability of an intervention occurring.

For an AV to be successful in an entire route, it has to be successful in each lane within the route. Hence, the P (AV successful in entire route)=product of all lanes from i to K in route P (success in lane i) defined as:

$$P(\text{Success in Route } R)=\Pi_{\forall l \in R}(1-EB(P(\text{failure in lane } l)))$$

As noted above, the empirical Bayes estimator returns a distribution for the probability parameter. Hence, the expected values for each probability for each lane can be used or a Monte Carlo type treatment can be performed where the β probability distribution of each lane is sampled N times and N different values of the Route level success probability are derived. This N sample set would be an empirical estimate for the probability distribution of the P (Success in Route R). A percentile (e.g., the 25th percentile) of this distribution may be used as the final metric.

Miles Per Intervention Metric

A downside of the probability of success metric is that it presumes a black and white treatment for the AV on the route in the form of the probability of the lane/route having one or more interventions. The challenge with this metric is how to find a meaningful threshold for this metric especially considering situations where there are multiple interventions within a few miles. On the other hand, if it is presumed that there is a tolerance on the minimum number of interventions on the route, then the miles per intervention (MPI) metric for a given route might be more intuitive and easier to set thresholds as follows:

$$MPI_R=(\text{Length of Trip } R)/(\Sigma_{\forall l \in R} \text{EventProportionPerTraversal}_i)$$

where $\text{EventProportionPerTraversal}_i = EB(P(\text{failure in lane } i))$.

Similar to the probability of success metric, a Monte Carlo type analysis may be performed here as well.

PDO Optimizer

Figure 3:
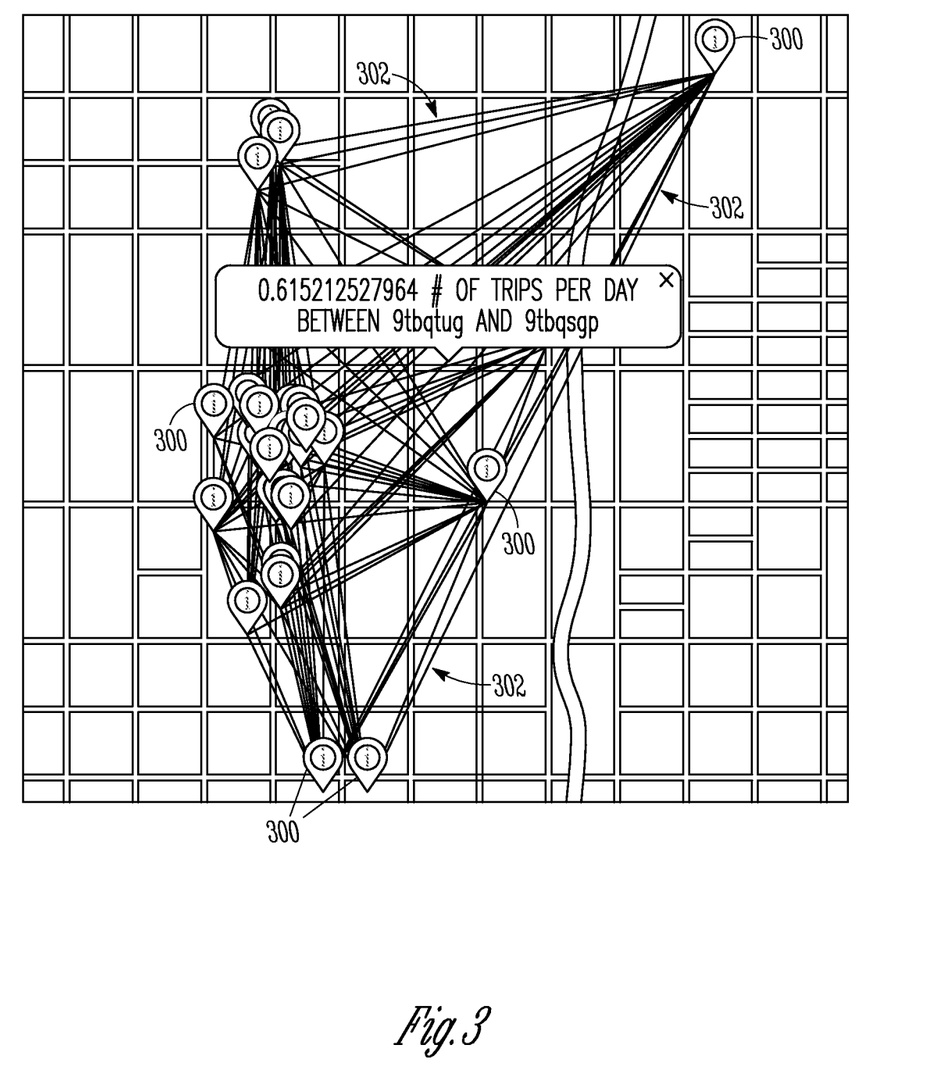
FIG. 3 is a sample map illustrating representation of geohashes as vertices and trips between the geohashes as edges between the vertices.

The PDO Optimizer 124 identifies the top K pickup/drop-off locations that extract the most trips while all trip pickup/drop-offs are constrained to be within a given connected component network, where the pick-up/drop-offs should occur within X meters of the lanes in the connected component. In sample embodiments, the top K pickup/drop-off locations are identified by geohashes, but it will be appreciated that the locations may be represented in other ways (e.g., GPS, lane GUIDs, etc.). The PDO Optimizer 124 receives as input the trips data and set of lanes in the form of connected component lane GUIDs and lane polygon data from the geographic map routes storage 110. The PDO Optimizer 124 outputs a list of K 7-character geohashes rank ordered by descending potential of unlocking the most trips. For example, the geohash clustering of pickup and drop-off results in a weighted undirected acyclic graph network may be represented as illustrated in FIG. 3 such that the vertices (nodes) 300 are the geohashes (geographic areas) that represent trip pick-up or drop-offs and the weighted edges 302 represent the number of trips that go between respective vertices 300 independent of direction. FIG. 3 illustrates a Folium map that represents the top 30 vertices 300 (geohashes) and edges 302 (trips between a pair of geohashes) for a sample data set. In FIG. 3, thicker edges represent more commonly used routes. Such a graph enables subgraphs to be extracted that represent the most trips among the regions represented by the respective geohashes.

Figure 4:
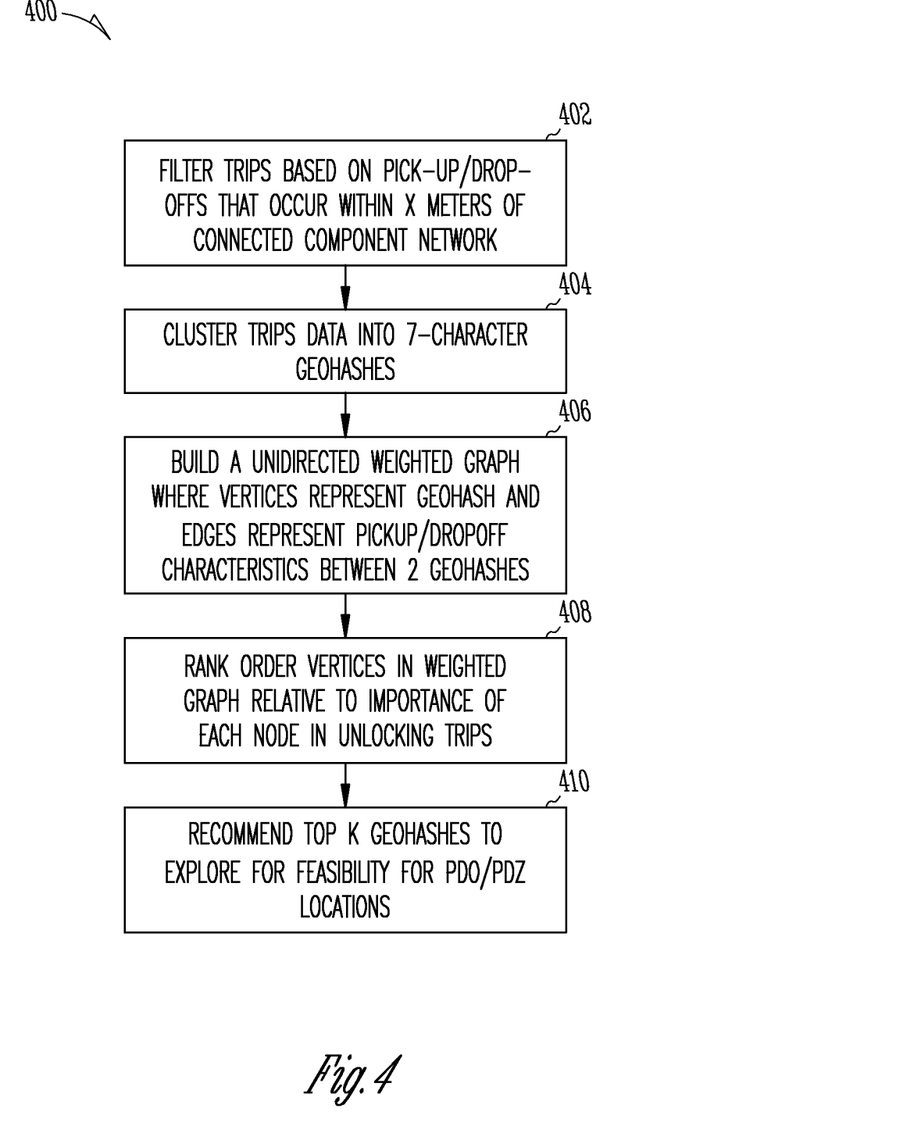
FIG. 4 is a flow chart of a pick-up/drop off (PDO) optimizer algorithm in a sample embodiment.

FIG. 4 illustrates a flow chart 400 of the operation of the PDO Optimizer 124 in a sample embodiment. As illustrated, the PDO Optimizer starts at 402 by filtering trips based on pick-up/drop-offs that occur within X meters of the connected component network. The trips data is clustered by a clustering algorithm at 404 into 7-character geohashes. A 7-character geohash was chosen since it represents a 114 square meter area, which is big enough to capture sufficient potential parking lots, established parking areas, and stopping zones that would be best suited for pickup and drop-off of customers but small enough that customers may still be open to walking from their location to the pickup/drop-off point. The PDO Optimizer 124 then builds an undirected weighted acyclic graph at 406 where the vertices 300 represent the geohash and the edges 302 represent the pickup/drop-off characteristics between two geohashes (see FIG. 3). The eigenvector centrality algorithm is run on this weighted graph at 408 in order to rank order all the vertices in the weighted graph relative to the importance of each node in unlocking the most trips to/from that node and thus identifying the areas to map or locations for PDZs. Eigenvector centrality measures the influence of a node in a weighted network by assigning relative scores to each node based on the concept that a node is important if other important nodes are connected to it as well. For a graph G:

$$G = (V, E) X_v = 1/\lambda \sum_{t \in M(v)} X_t$$

where $X_v$ is the weight of a particular vertex in the graph, λ is a constant weight and M(v) are the set of vertices that this vertex is connected to. $X_t$ is the relative weight of that vertex. The $X_t$ s can be found by calculating the eigenvalues of the adjacency matrix and then taking the eigenvector associated to the top eigenvalue as the measure for $X_i$.

Alternatively, the influence of a node in a weighted network may be found at 408 through brute force, whereby the PDO Optimizer 124 would go through every combination of vertices 300 seeded from a particular node to find the identification of the relative scores for each node and to page rank the nodes accordingly.

Finally, at 410 the top K geohashes are recommended as geohashes to be explored as to whether there are feasible PDO/PDZ locations within the recommended geohashes. The ranked list of nodes thus identifies proposed locations for PDZs, locations for positioning AVs, where to map roads in an unmapped area, and the like. For example, the ranked list of nodes for PDZs may be used to select roadways for mapping and routes for AVs to use to transport paying riders between the PDZs.

It is noted that there are different types of weights that can be annotated on the weighted graph. A simple weight would be the mean number of trips per day for that given pickup and drop-off location. However, the problem with this metric is that it is not robust to outliers and may not be realistic to the addressable trips by a single AV. For example, if more than one trip occurred within the same hour between that pickup and drop-off geohash pair, the AV has a smaller chance of getting both trips. In order to mitigate these issues, another metric may be used that is essentially the number of unique hourly buckets where one or more trips occurred. Other metrics that may be used include mean trips per hour, the number of hourly buckets across the entire dataset time range where there is at least one trip in that hour, the distribution of trips over hours or days, directionality of the pickup/drop-off, the profitability of the trip, and the like. It will be appreciated that such metrics may be used to position AVs in real-time to maximize utilization and/or profitability.

In any case, the overall goal of identifying a PDO geohash network is to maximize the number of trips per day that a single AV does for the entire network of PDOs that are selected. The PDO optimizer 124 implemented with the flow chart of FIG. 4 is a sample method for such usage optimization.

The system described herein is based on a number of assumptions. For example, it is assumed that each lane is independent from all the other lanes from every perspective. Thus, the failure event on each lane is an independent and identically distributed random variable. Also, each of the pre-defined PDOs are assumed to be characterized by a single lane GUID that defines the pickup or drop-off lane GUIDs of all relevant trips in the network. This assumption allows the analysis to be greatly simplified and to provide a better chance for a set of trips to generate a connected component. It is further assumed that a binomial random variable is used to characterize the probability distribution of the number of events on a specific lane and that only trips (e.g., UberX trips) that have pickups and drop-offs within the known PDO geohash set are considered for analysis. Lane GUIDs are further assumed to rarely change across map versions. Thus, for the same spatial area, the lane GUID tends to stay the same across different map versions. Also, new failure modes due to continuous development work are assumed to cause new lanes that are recommended to perform poorly over time. Finally, routing is assumed to be performed at the lane level. Hence, the specific route from source to destination is a recommended route that is the safest. However, in real-time, the utilized lanes could be different. The motion planning subsystem of the AV has the responsibility of taking the recommended route as an input and deciding how to best route plan using this information in real-time.

Autonomous Vehicle

The positioning system 120 described herein has been described in sample embodiments for use in placing autonomous vehicles or semi-autonomous vehicles. However, it will be appreciated by those skilled in the art that the positioning system 120 may also be used to position conventional ride-sharing vehicles (e.g., Uber vehicles) and taxis. In the context of the present disclosure, an autonomous vehicle (e.g., a ground-based vehicle, air-based vehicle, other vehicle type) can include a vehicle computing system that implements a variety of systems. For instance, the vehicle computing system can include one or more sensors (e.g., image capture devices, RADAR devices, LIDAR devices, etc.), one or more computing devices for determining autonomous navigation, and one or more vehicle control system(s) (e.g., for controlling braking, steering, powertrain). The sensor(s) can be configured to obtain sensor data used to detect object(s) including, for example, pedestrians that are located within the travel route (e.g., road) of the autonomous vehicle, travelling in an adjacent travel way (e.g., on a sidewalk, a running path), etc. The sensor data can be indicative of locations associated with the object(s) within the surrounding environment of the autonomous vehicle at one or more time(s). The sensor data can be provided to one or more computing devices in the vehicle computing system.

In addition to the sensor data, the vehicle computing system can retrieve, access, or otherwise obtain map data that provides other detailed information about the surrounding environment of the autonomous vehicle. The map data can provide information regarding the identity and location of different travel ways (e.g., roads, road segments, lanes, lane segments, parking lanes, turning lanes, bicycle lanes, or other portions of a particular travel way). In some examples, travel way portions within accessed map data can include one or more descriptors including, for example, a district identifier, a travel way portion identifier, a start point for the travel way portion, an end point for the travel way portion, a directionality (e.g., direction of traffic flow), and/or connectivity identifiers for other travel way portions that are predecessors and/or successors to a given travel way portion. Map data can also include the identity and location of different items than travel ways, including but not limited to buildings, maintenance/service locations for the autonomous vehicles, parking areas, traffic signs, traffic lights, traffic control devices, and/or any other map data that provides information that assists the vehicle computing system in comprehending and perceiving its surrounding environment and its relationship thereto.

The vehicle computing system can be configured to determine travel routes for the autonomous vehicle based at least in part on the map data. In some examples, travel routes can be determined in accordance with a navigational objective (e.g., traveling to a destination location to perform a service such as a rideshare service, delivery service, courier service, etc.). Because autonomy systems can rely on computer-based determination of travel routes as opposed to human determination, it can sometimes be desirable to implement constraints on particular travel areas that should be either included and/or excluded as permissible for navigation. Specific areas may be included as permissible for navigation by particular autonomous vehicles that are assigned to perform services in a given area, thus affording efficient distribution of fleet resources.

Once a travel route is determined, a vehicle computing system can determine a motion plan to control motion of the autonomous vehicle along the determined travel route. The motion plan can be further based on any objects proximate to the autonomous vehicle (e.g., pedestrians, other vehicles, traffic control devices, etc.) that are detected by the vehicle's sensors, image capture devices, or other data acquisition system components. For instance, the vehicle computing system can be a computing system that includes various sub-systems that cooperate to perceive the surrounding environment of the autonomous vehicle and determine a motion plan for controlling the motion of the autonomous vehicle. For instance, the vehicle computing system can include a perception system, a prediction system, and a motion planning system.

In other implementations of the disclosed systems and methods, one or more remote computing devices can be configured to implement systems and method of controlling placement and operation of one or more autonomous vehicles. In some examples, such remote computing device(s) can be included as part of a central control system that is in wireless communication with a plurality of autonomous vehicles, such as a fleet of autonomous vehicles providing one or more services (rideshare service, delivery service, courier service, etc.).

Software and Hardware Architecture

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel. Furthermore, computing tasks discussed herein as being performed at computing device(s) remote from the vehicle can instead be performed at the vehicle (e.g., via the vehicle computing system), or vice versa. Such configurations can be implemented without deviating from the scope of the present disclosure.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 5:
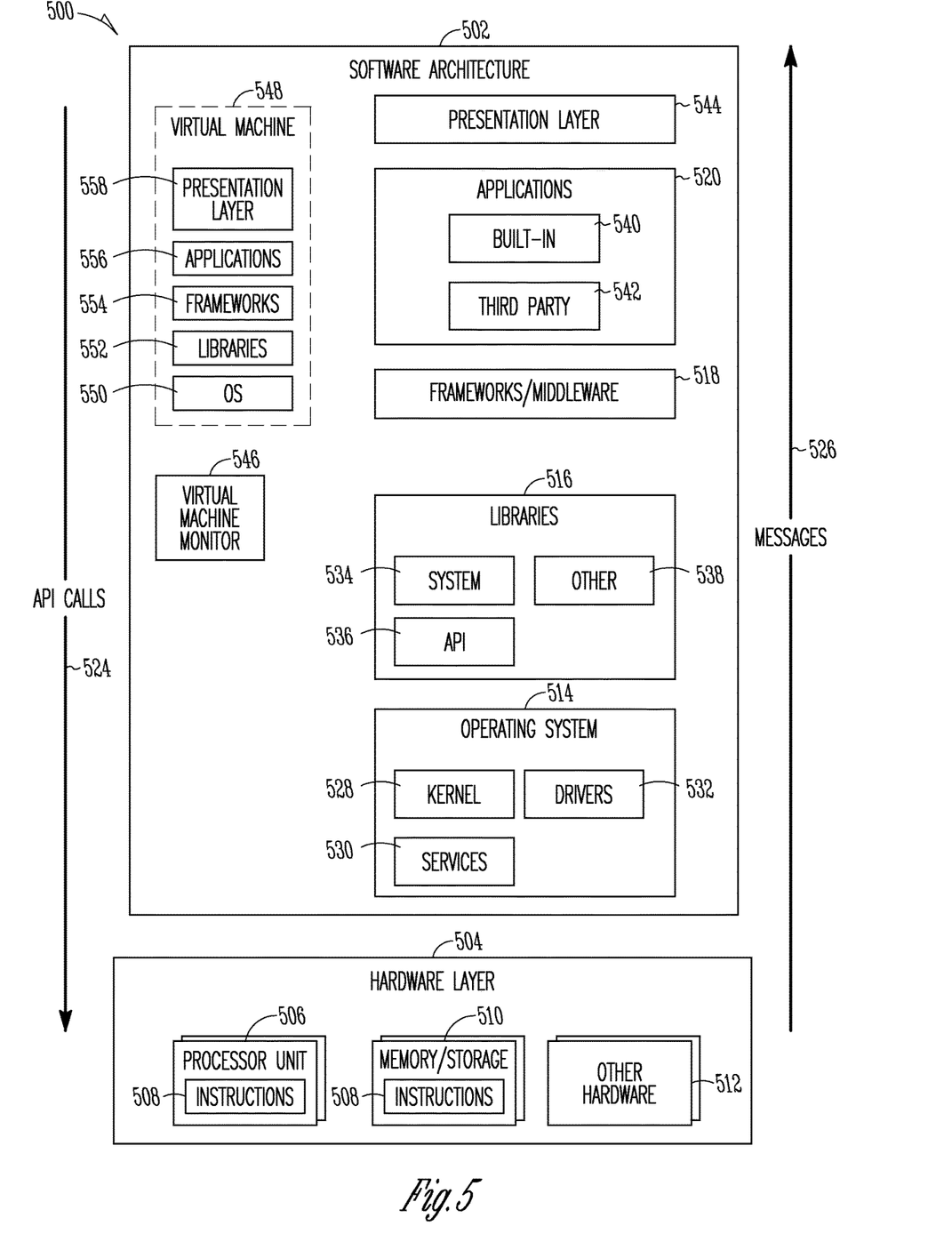
FIG. 5 is a block diagram showing one example of a software architecture for a computing device in a sample embodiment.

FIG. 5 is a block diagram 500 showing one example of a software architecture 502 for a computing device. The software architecture 502 may be used in conjunction with various hardware architectures, for example, as described herein. FIG. 5 is merely a non-limiting example of a software architecture 502 and many other architectures may be implemented to facilitate the functionality described herein. A representative hardware layer 504 is illustrated and can represent, for example, any conventional computing devices. In some examples, the hardware layer 504 may be implemented according to an architecture 600 of FIG. 6.

The representative hardware layer 504 comprises one or more processing units 506 having associated executable instructions 508. The executable instructions 508 represent the executable instructions of the software architecture 502, including implementation of the methods, modules, components, and so forth of FIGS. 1-4. The hardware layer 504 also includes memory and/or storage modules 510, which also have the executable instructions 508. The hardware layer 504 may also comprise other hardware 512, which represents any other hardware of the hardware layer 504, such as the other hardware illustrated as part of the architecture 600 in FIG. 6.

In the example architecture of FIG. 5, the software architecture 502 may be conceptualized as a stack of layers where each layer provides particular functionality. For example, the software architecture 502 may include layers such as an operating system 514, libraries 516, frameworks/middleware 518, applications 520, and a presentation layer 544. Operationally, the applications 520 and/or other components within the layers may invoke API calls 524 through the software stack and receive a response, returned values, and so forth illustrated as messages 526 in response to the API calls 524. The layers illustrated are representative in nature and not all software architectures have all layers. For example, some mobile or special-purpose operating systems may not provide a frameworks/middleware 518 layer, while others may provide such a layer. Other software architectures may include additional or different layers.

The operating system 514 may manage hardware resources and provide common services. The operating system 514 may include, for example, a kernel 528, services 530, and drivers 532. The kernel 528 may act as an abstraction layer between the hardware and the other software layers. For example, the kernel 528 may be responsible for memory management, processor management (e.g., scheduling), component management, networking, security settings, and so on. The services 530 may provide other common services for the other software layers. In some examples, the services 530 include an interrupt service. The interrupt service may detect the receipt of a hardware or software interrupt and, in response, cause the software architecture 502 to pause its current processing and execute an Interrupt Service Routine (ISR) when an interrupt is received. The ISR may generate an alert.

The drivers 532 may be responsible for controlling or interfacing with the underlying hardware. For instance, the drivers 532 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 516 may provide a common infrastructure that may be utilized by the applications 520 and/or other components and/or layers. The libraries 516 typically provide functionality that allows other software modules to perform tasks in an easier fashion than by interfacing directly with the underlying operating system 514 functionality (e.g., kernel 528, services 530, and/or drivers 532). The libraries 516 may include system libraries 534 (e.g., C standard library) that may provide functions such as memory allocation functions, string manipulation functions, mathematic functions, and the like. In addition, the libraries 516 may include API libraries 536 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., Web Kit that may provide web browsing functionality), and the like. The libraries 516 may also include a wide variety of other libraries 538 to provide many other APIs to the applications 520 and other software components/modules.

The frameworks 518 (also sometimes referred to as middleware) may provide a higher-level common infrastructure that may be utilized by the applications 520 and/or other software components/modules. For example, the frameworks 518 may provide various graphical user interface (GUI) functions, high-level resource management, high-level location services, and so forth. The frameworks 518 may provide a broad spectrum of other APIs that may be utilized by the applications 520 and/or other software components/modules, some of which may be specific to a particular operating system or platform.

The applications 520 include built-in applications 540 and/or third-party applications 542. Examples of representative built-in applications 540 may include, but are not limited to, a contacts application, a browser application, a book reader application, a location application, a media application, a messaging application, and/or a game application. The third-party applications 542 may include any of the built-in applications 540 as well as a broad assortment of other applications. In a specific example, the third-party application 542 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 542 may invoke the API calls 524 provided by the mobile operating system such as the operating system 514 to facilitate functionality described herein.

The applications 520 may utilize built-in operating system functions (e.g., kernel 528, services 530, and/or drivers 532), libraries (e.g., system libraries 534, API libraries 536, and other libraries 538), or frameworks/middleware 518 to create user interfaces to interact with users of the system. Alternatively, or additionally, in some systems, interactions with a user may occur through a presentation layer, such as the presentation layer 544. In these systems, the application/module "logic" can be separated from the aspects of the application/module that interact with a user.

Some software architectures utilize virtual machines. For example, systems described herein may be executed utilizing one or more virtual machines executed at one or more server computing machines. In the example of FIG. 5, this is illustrated by a virtual machine 548. A virtual machine creates a software environment where applications/modules can execute as if they were executing on a hardware computing device. The virtual machine 548 is hosted by a host operating system (e.g., the operating system 514) and typically, although not always, has a virtual machine monitor 546, which manages the operation of the virtual machine 548 as well as the interface with the host operating system (e.g., the operating system 514). A software architecture executes within the virtual machine 548, such as an operating system 550, libraries 552, frameworks/middleware 554, applications 556, and/or a presentation layer 558. These layers of software architecture executing within the virtual machine 548 can be the same as corresponding layers previously described or may be different.

Figure 6:
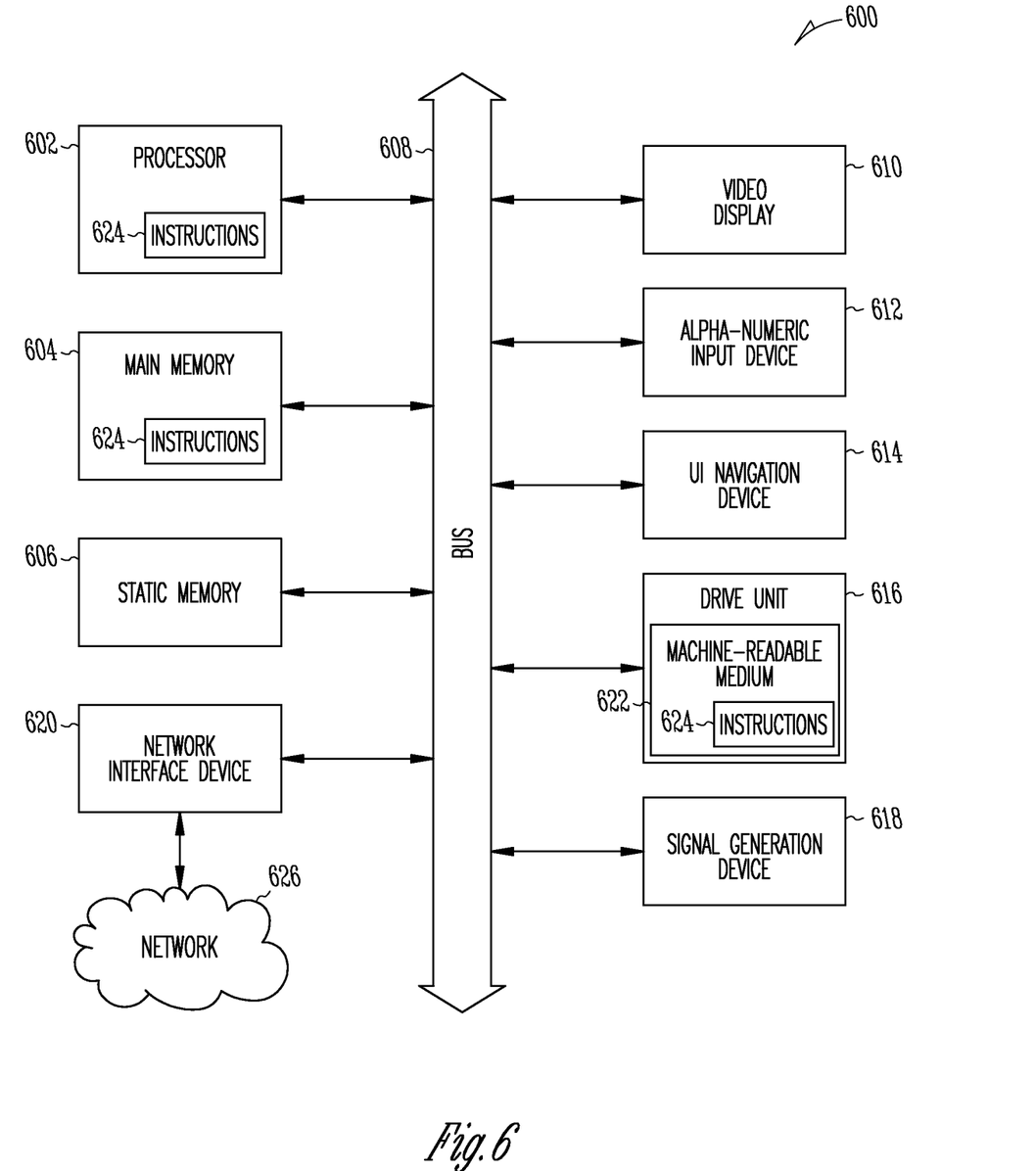
FIG. 6 is a block diagram illustrating a computing device hardware architecture within which a set or sequence of instructions can be executed to cause a machine to perform examples of any one of the methodologies discussed herein.

FIG. 6 is a block diagram illustrating a computing device hardware architecture 600, within which a set or sequence of instructions can be executed to cause a machine to perform examples of any one of the methodologies discussed herein. The architecture 600 may describe, a computing device for executing the functionality of the positioning system 120, including the functionality of the recommender 122, PDO Optimizer 124, and evaluator 126 as described herein.

The architecture 600 may operate as a standalone device or may be connected (e.g., networked) to other machines. In a networked deployment, the architecture 600 may operate in the capacity of either a server or a client machine in server-client network environments, or it may act as a peer machine in peer-to-peer (or distributed) network environments. The architecture 600 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 600 includes a processor unit 602 comprising at least one processor (e.g., a central processing unit (CPU), a graphics processing unit (GPU), or both, processor cores, compute nodes, etc.). The architecture 600 may further comprise a main memory 604 and a static memory 606, which communicate with each other via a link 608 (e.g., bus). The architecture 600 can further include a video display unit 610, an input device 612 (e.g., a keyboard), and a UI navigation device 614 (e.g., a mouse). In some examples, the video display unit 610, input device 612, and UI navigation device 614 are incorporated into a touch-screen display. The architecture 600 may additionally include a storage device 616 (e.g., a drive unit), a signal generation device 618 (e.g., a speaker), a network interface device 620, and one or more sensors (not shown), such as a Global Positioning System (GPS) sensor, compass, accelerometer, or other sensor.

In some examples, the processor unit 602 or another suitable hardware component may support a hardware interrupt. In response to a hardware interrupt, the processor unit 602 may pause its processing and execute an ISR, for example, as described herein.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, within the static memory 606, and/or within the processor unit 602 during execution thereof by the architecture 600, with the main memory 604, the static memory 606, and the processor unit 602 also constituting machine-readable media.

Executable Instructions and Machine-Storage Medium

The various memories (i.e., 604, 606, and/or memory of the processor unit(s) 602) and/or storage device 616 may store one or more sets of instructions and data structures (e.g., instructions) 624 embodying or utilized by any one or more of the methodologies or functions described herein.

These instructions, when executed by processor unit(s) 602 cause various operations to implement the disclosed examples.

As used herein, the terms "machine-storage medium," "machine-readable storage device," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium." As used herein, the term "signal medium" or "transmission medium" shall be taken to include any form of modulated data signal, carrier wave, and so forth. The term "modulated data signal" means a signal that has one or more of its characteristics set or changed in such a matter as to encode information in the signal.

The instructions 624 can further be transmitted or received over a communications network 626 using a transmission medium via the network interface device 620 utilizing any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 5G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of such features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A computer-implemented method of determining where to position vehicles for trip optimization or where to map roads for use by autonomous or semi-autonomous vehicles, comprising:
   identifying, from historical trip data, common pickup and drop-off points within a geographical area, the common pickup and drop-off points being defined by respective geohashes as nodes in the geographical area;
   identifying from the historical trip data a number of trips between respective nodes in the geographical area within a predetermined time frame, the number of trips being defined as edges between nodes in the geographical area;
   processing the nodes and edges to score each node to identify most active nodes within the geographical area as potential pickup/drop-off zones in the geographical area;
   evaluating top-k potential pickup/drop-off zones for suitability as a pickup/drop-off zone; and
   providing at least one of lane IDs, pickup/drop-off zones, and trip lists for use in positioning vehicles or mapping roads based on the evaluated top-k pickup/drop-off zones in the geographical area.

2. The computer-implemented method of claim 1, further comprising identifying from the historical trip data a subset of an existing map as the geographical area.

3. The computer-implemented method of claim 1, wherein identifying common pickup and drop-off points from historical trip data comprises evaluating lane level performance metrics in the historical trip data to identify and to exclude lanes having more than a predetermined number of autonomous vehicle failure events.

4. The computer-implemented method of claim 1, further comprising deriving a connected component network of lanes from the historical trip data and extracting a subgraph from the connected component network for lanes having vehicle traversal data.

5. The computer-implemented method of claim 4, further comprising routing vehicle trips on the connected component network and matching pickup and drop-off points for vehicle trips to specific lane GUIDs.

6. The computer-implemented method of claim 5, further comprising using lane level performance metrics to compute estimates for a probability of success of a vehicle completing a vehicle trip along a selected route.

7. The computer-implemented method of claim 5, further comprising selecting a trip and a corresponding route based on satisfying a user selected metric.

8. The computer-implemented method of claim 7, further comprising extracting a superset of all lanes involved in selected trips and extracting a connected component within the superset of all lanes.

9. The computer-implemented method of claim 4, further comprising removing trips from the historical trip data that do not satisfy a minimum performance requirement.

10. The computer-implemented method of claim 9, further comprising rederiving the connected component network of lanes after removing the trips that do not satisfy the minimum performance requirement.

11. The computer-implemented method of claim 10, further comprising optimizing the pickup/drop-off zones that enable more trips within the rederived connected component network.

12. The computer-implemented method of claim 10, wherein optimizing the pickup/drop-off zones comprises filtering trips to identify pickup/drop-offs that occur within a given number of meters from the rederived connected component network.

13. The computer-implemented method of claim 10, further comprising using a clustering algorithm to cluster trips data in the rederived connected component network into 7-character geohashes and building an undirected weighted graph having nodes representing geohashes and edges representing pickup/drop-off characteristics between respective geohashes.

14. The computer-implemented method of claim 13, further comprising running an eigenvector centrality algorithm on the undirected weighted graph to rank order the nodes relative to importance of each node in unlocking a highest number of trips.

15. The computer-implemented method of claim 13, wherein weights for nodes are determined as a function of a mean number of trips per period of time for pickups and drop-offs at a node.

16. The computer-implemented method of claim 13, wherein the edges are represented as more significant in the undirected weighted graph as more trips data is provided between respective geohashes defining the edges.

17. The computer-implemented method of claim 4, further comprising removing from the historical trip data any lanes having more than a predetermined number of autonomous vehicle failure events and evaluating route level performance metrics for the connected component network.

18. The computer-implemented method of claim 1, further comprising using an empirical Bayesian algorithm to augment the historical trip data to normalize historical trip data comprising a large number of traversals over identified lanes with historical trip data comprising a small number of traversal over identified lanes.

19. The computer-implemented method of claim 6, further comprising calculating a probability of success metric for the selected route as a function of a product of chances of success for each lane in the selected route.

20. The computer-implemented method of claim 14 further comprising calculating a miles per intervention metric as a function of a length of a trip divided by a number of lane failures per vehicle traversal.

21. The computer-implemented method of claim 20, further comprising further comprising using an empirical Bayesian algorithm to estimate miles per intervention.

22. A computer-implemented system for positioning vehicles, the system comprising:
    at least one processor unit, the at least one processor unit being programmed to execute operations comprising:
    identifying, from historical trip data, common pickup and drop-off points within a geographical area, the common pickup and drop-off points being defined by respective geohashes as nodes in the geographical area;
    identifying from the historical trip data a number of trips between respective nodes in the geographical area within a predetermined time frame, the number of trips being defined as edges between nodes in the geographical area;
    processing the nodes and edges to score each node to identify most active nodes within the geographical area as potential pickup/drop-off zones in the geographical area;
    evaluating top-k potential pickup/drop-off zones for suitability as a pickup/drop-off zone; and
    providing at least one of lane IDs, pickup/drop-off zones, and trip lists for use in positioning vehicles or mapping roads based on the evaluated top-k pickup/drop-off zones in the geographical area.

* * * * *